(12) United States Patent
Rhee et al.

(10) Patent No.: US 10,402,564 B2
(45) Date of Patent: Sep. 3, 2019

(54) FINE-GRAINED ANALYSIS AND PREVENTION OF INVALID PRIVILEGE TRANSITIONS

(71) Applicant: NEC Laboratories America, Inc., Princeton, NJ (US)

(72) Inventors: Junghwan Rhee, Princeton, NJ (US); Yuseok Jeon, West Lafayette, IN (US); Zhichun Li, Princeton, NJ (US); Kangkook Jee, Princeton, NJ (US); Zhenyu Wu, Plainsboro, NJ (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 224 days.

(21) Appl. No.: 15/623,589

(22) Filed: Jun. 15, 2017

(65) Prior Publication Data

US 2018/0052998 A1 Feb. 22, 2018

Related U.S. Application Data

(60) Provisional application No. 62/375,586, filed on Aug. 16, 2016.

(51) Int. Cl.
G06F 21/56 (2013.01)
G06F 21/62 (2013.01)
G06F 21/54 (2013.01)
G06F 21/57 (2013.01)

(52) U.S. Cl.
CPC .......... *G06F 21/566* (2013.01); *G06F 21/54* (2013.01); *G06F 21/563* (2013.01); *G06F 21/577* (2013.01); *G06F 21/6218* (2013.01); *G06F 2221/034* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 5,043,878 A | * | 8/1991 | Ooi | G06F 9/30043 711/163 |
| 6,308,274 B1 | * | 10/2001 | Swift | G06F 21/604 710/200 |
| 7,013,395 B1 | * | 3/2006 | Swiler | H04L 63/1433 713/151 |
| 8,621,647 B1 | * | 12/2013 | Tinnes | G06F 21/57 726/27 |
| 8,881,288 B1 | * | 11/2014 | Levy | G06F 21/577 709/225 |
| 9,306,965 B1 | * | 4/2016 | Grossman | H04L 63/1416 |
| 2009/0271863 A1 | * | 10/2009 | Govindavajhala | G06F 21/577 726/23 |

(Continued)

*Primary Examiner* — Kaveh Abrishamkar
(74) *Attorney, Agent, or Firm* — Joseph Kolodka

(57) ABSTRACT

A computer-implemented method for analyzing operations of privilege changes is presented. The computer-implemented method includes inputting a program and performing source code analysis on the program by generating a privilege control flow graph (PCFG), generating a privilege data flow graph (PDFG), and generating a privilege call context graph (PCCG). The computer-implemented method further includes, based on the source code analysis results, instrumenting the program to perform inspections on execution states at privilege change operations, and performing runtime inspection and anomaly prevention.

20 Claims, 8 Drawing Sheets

(56) References Cited

U.S. PATENT DOCUMENTS

| | | | | |
|---|---|---|---|---|
| 2011/0258610 A1* | 10/2011 | Aaraj | ............... | G06F 21/554 |
| | | | | 717/128 |
| 2013/0097706 A1* | 4/2013 | Titonis | ............... | G06F 21/56 |
| | | | | 726/24 |
| 2017/0308712 A1* | 10/2017 | Chari | ............... | G06F 21/577 |

* cited by examiner

FINE-GRAINED ANALYSIS AND PREVENTION OF INVALID PRIVILEGE TRANSITIONS

RELATED APPLICATION INFORMATION

This application claims priority to Provisional Application No. 62/375,586, filed on Aug. 16, 2016, incorporated herein by reference in its entirety.

BACKGROUND

Technical Field

The present invention relates to computer software and, more particularly, to fine-grained analysis and prevention of invalid privilege transitions.

Description of the Related Art

A privilege escalation (PE) attack refers to a type of computer-based attack in which an attacker attempts to exploit inadequate or nonexistent controls to gain access to resources of a computer software application that are intended for access only by valid users having privileged rights, or that are intended for access by valid users having even non-privileged rights but that are meant to be off-limits to the attacker. It would be advantageous to check computer software applications to determine whether they are vulnerable to PE attacks and to provide methods for preventing such PE attacks.

SUMMARY

A computer-implemented method for analyzing operations of privilege changes is presented. The method includes inputting a program and performing source code analysis on the program by generating a privilege control flow graph (PCFG), generating a privilege data flow graph (PDFG), and generating a privilege call context graph (PCCG). The method further includes, based on the source code analysis results, instrumenting the program to perform inspections on execution states at privilege change operations, and performing runtime inspection and anomaly prevention.

A system for analyzing operations of privilege changes is presented. The system includes a memory and a processor in communication with the memory, wherein the processor is configured to input a program, perform source code analysis on the program by: generating a privilege control flow graph (PCFG); generating a privilege data flow graph (PDFG); and generating a privilege call context graph (PCCG), based on the source code analysis results, instrument the program to perform inspections on execution states at privilege change operations, and perform runtime inspection and anomaly prevention.

A non-transitory computer-readable storage medium including a computer-readable program for analyzing operations of privilege changes is presented, wherein the computer-readable program when executed on a computer causes the computer to perform the steps of inputting a program, performing source code analysis on the program by: generating a privilege control flow graph (PCFG); generating a privilege data flow graph (PDFG); and generating a privilege call context graph (PCCG), based on the source code analysis results, instrumenting the program to perform inspections on execution states at privilege change operations, and performing runtime inspection and anomaly prevention.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
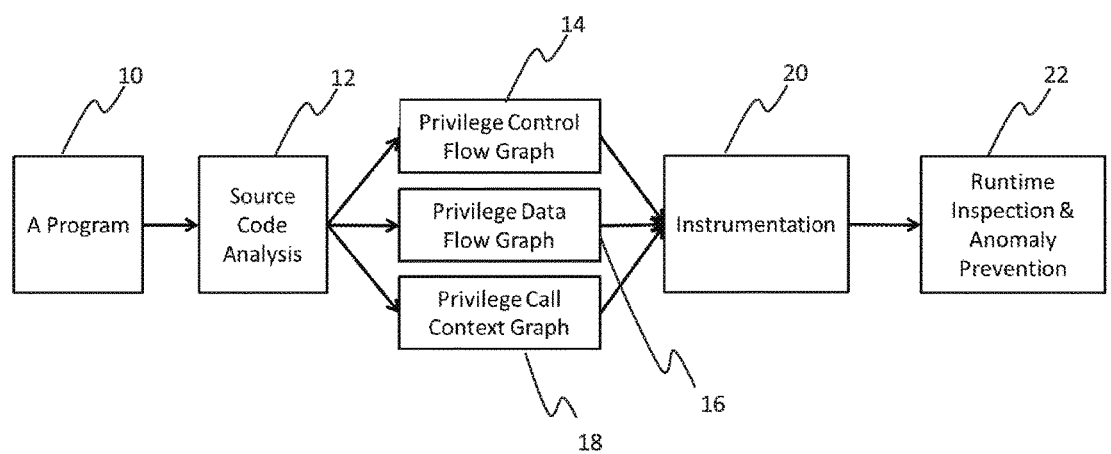
FIG. 1 is a block/flow diagram of an architecture for privilege flow analysis, in accordance with embodiments of the present invention.

A great percentage of operating systems that are used today have user account privileges. These privileges may be for security reasons to make sure that someone does not leak internal company information out, or to protect the well-being of a computer from some persons incompetence with the computer, or to prevent a grave mistake from crashing the computer, or to stop system failure or hacking of a computer (internally or externally) through an account with restricted access to files. A privilege is defined as the delegation of authority over a computer system. A privilege allows a user to perform an action. Examples of various privileges include an ability to create a file in a directory, or to read or delete a file, access a device, or have read or write permission to a socket for communicating over the Internet. Users who have been delegated extra levels of control are called privileged. Users who lack most privileges are defined as unprivileged, regular, or normal users. Privileges can either be automatic, granted, or applied for.

Some computer programs make transitions among multiple privilege levels to access low level operating system (OS) resources or run as low level services. High privilege operations such as administrative privileges have high impact that can manipulate the computer system when they are misused. Therefore, such programs having complicated privilege transitions that need to be monitored. Understanding what kinds of multiple privilege behavior would be possible, inspecting and preventing improper transitions which are unexpected in the original program are objectives for providing secure operation of such programs.

The exemplary embodiments of the present invention propose combining the following three techniques: (i) static source code-based analysis on privilege change operations, (ii) program instrumentation for an inspection of the privilege change operations, and (iii) runtime privilege tracking and inspection, and anomaly detection.

In accordance with the exemplary embodiments of the present invention, regarding the static source code-based analysis on privilege change operations, for an input program in its source code form, a source code analysis is performed to analyze operations of privilege changes. For instance, in Linux there are multiple variants of setuid functions which can change operating system data fields related to each process' privilege levels. Specifically three types of information are analyzed and collected. (1) The code location (call site) of privilege change operations. (2) The data flow of the parameters of privilege change operations. This includes the data types, possible data values, and the dependent source of the data explaining where they come from in other code. (3) Possible call stacks when the privilege change operations are invoked. If the program does not have any privilege change code, it is also reported as an empty set of privilege change operations to prevent any privilege change activity at runtime.

In accordance with the exemplary embodiments of the present invention, regarding the program instrumentation for an inspection of the privilege change operations, the program is instrumented to include new code into the program using source code instrumentation techniques for the inspection of all privilege change operations, application of policies on control flow and dataflow constructed from the first technique, and a proper handling of detection of abnormal privilege changes.

In accordance with the exemplary embodiments of the present invention, regarding the runtime privilege tracking and inspection, and anomaly detection, at runtime, the following three behaviors are checked based on the collected information from the first technique. (1) Whether the privilege change operations are invoked from places obtained in a static analysis. (2) Whether parameters of privilege change operations are consistent with data obtained in the static analysis. (3) Whether call stacks at the privilege change operations are consistent with the possible call stacks obtained from the static analysis. Any violation of policies which is not expected from the source code static analysis is reported as an anomaly. On its detection, the privilege change operation is prevented and also the program is suspended for its safety while its execution states are stored as a file for an offline analysis.

FIG. 1 is a block/flow diagram of an architecture for privilege flow analysis, in accordance with embodiments of the present invention.

For an input program 10 in its source code form, a source code analysis module 12 is executed to understand its capability for privilege changes. This analysis produces three types of information.

The first type of information is a privilege control flow graph (PCFG) 14 showing code locations (call site) of privilege change operations.

The second type of information is a privilege data flow graph (PDFG) 16 showing data flow of parameters of privilege change operations. This include data types, possible data values, and dependent sources of the data explaining where they come from in other code.

The third type of information is a privilege call context graph (PCCG) 18 showing possible call stacks when the privilege change operations are invoked.

Based on the information collected in the source code analysis module 12, the program 10 is instrumented to perform inspections (by an instrumentation module 20) on execution states at privilege operations. At runtime, for every privilege operation, it is inspected whether it corresponds to a behavior shown in the source code of the program 10. Any abnormal behavior is prevented and the program 10 is suspended by the runtime inspection and anomaly prevention module 22.

Figure 2:
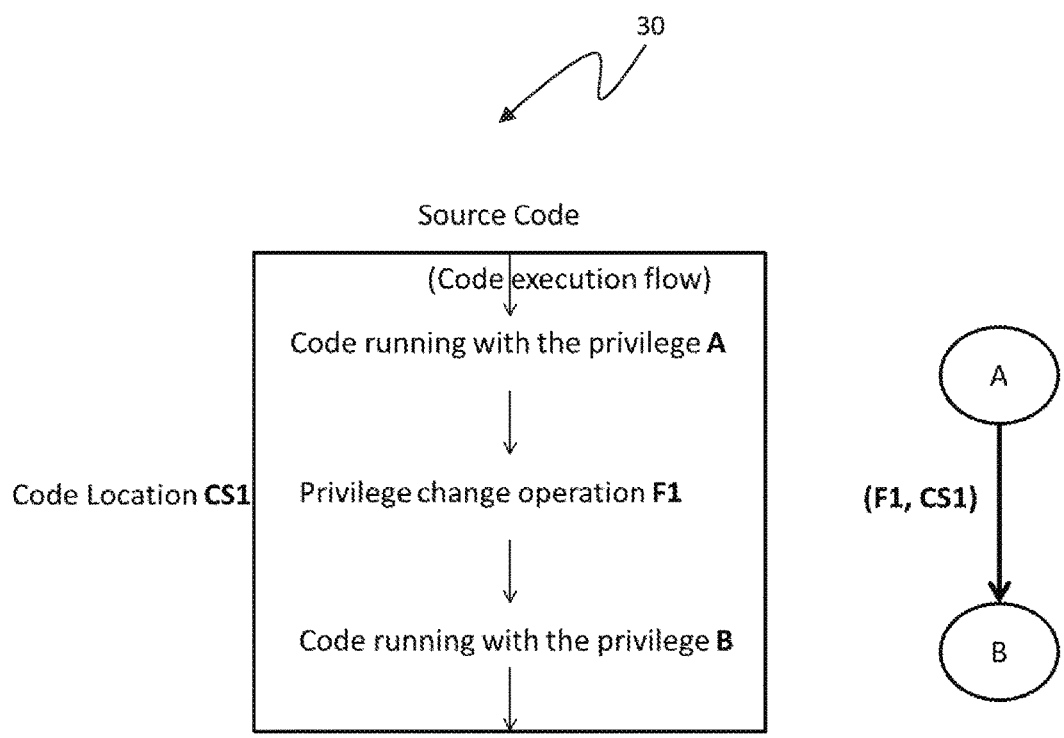
FIG. 2 is a block/flow diagram of an example node and edge of a privilege control flow graph, in accordance with embodiments of the present invention.

FIG. 2 is a block/flow diagram 30 of an example node and edge of a privilege control flow graph, in accordance with embodiments of the present invention.

The source code analysis module 12 gets the source code of the program 10 (FIG. 1) and performs an inter-procedural analysis to produce the following three representations regarding the usage of privilege change operations of the program 10.

The privilege control flow graph (PCFG) 14 is defined as a graph where a node is a privilege state of a program and an edge is a transition between a source and a destination privilege state. In addition, the edge has additional properties regarding the privilege change operation: the privilege change operation, F1, and the code location, CS1, where the privilege change function F1 is invoked.

Graph 14 further includes all transitions of privileges inside the program 10 in the nodes and all possible transitions regarding what privilege change functions are used and where they are invoked.

Figure 3:
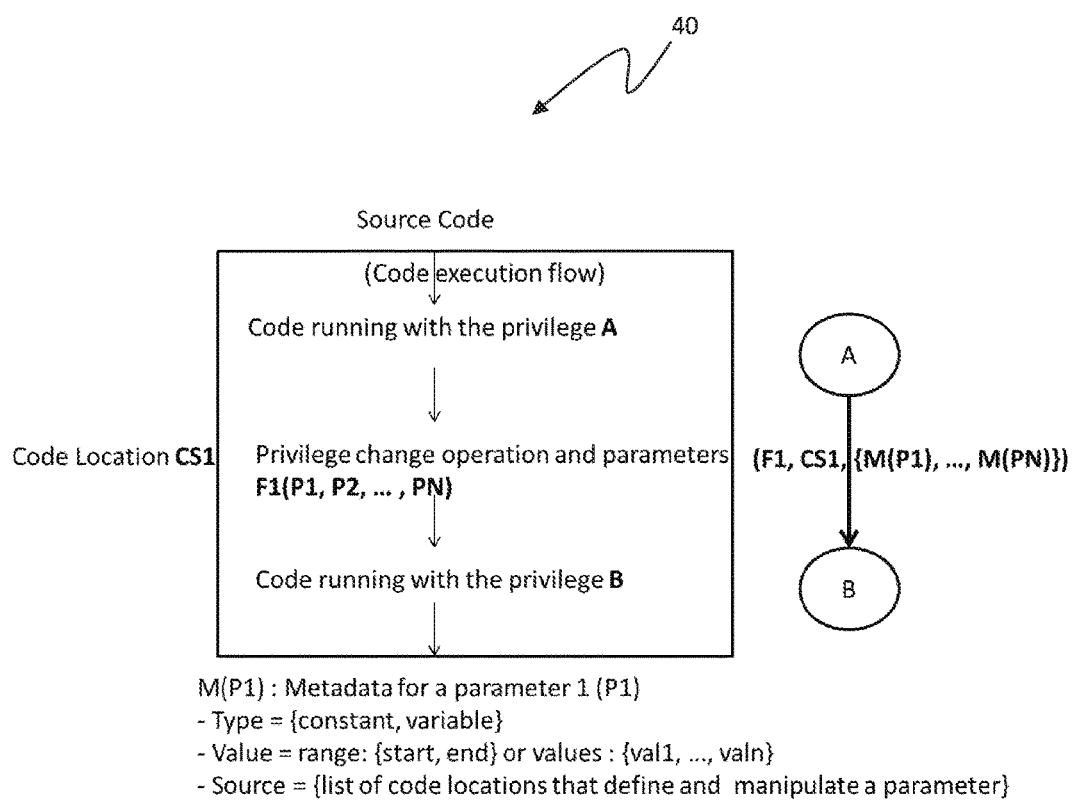
FIG. 3 is a block/flow diagram of an example privilege data flow graph, in accordance with embodiments of the present invention.

FIG. 3 is a block/flow diagram 40 of an example privilege data flow graph, in accordance with embodiments of the present invention.

The privilege data flow graph (PDFG) 16 is defined as a graph where a node is a privilege state of a program and an edge is a transition between a source and destination privilege states. An edge has properties regarding individual parameters for a privilege change operation. If P1, P2, . . . , PN are the defined parameters of a privilege change operation and M(PN) is a metadata for a parameter PN, the information stored in an edge in addition to the information of PCFG is represented as {M(P1), . . . , M(PN)}.

A metadata for a parameter includes the following three properties. The first property indicates whether the parameter is a constant or a variable. The second property shows possible values either as a list of values or a range of values with start and end values. The third property represents a list of source code locations, which define and manipulate the value.

Figure 4:
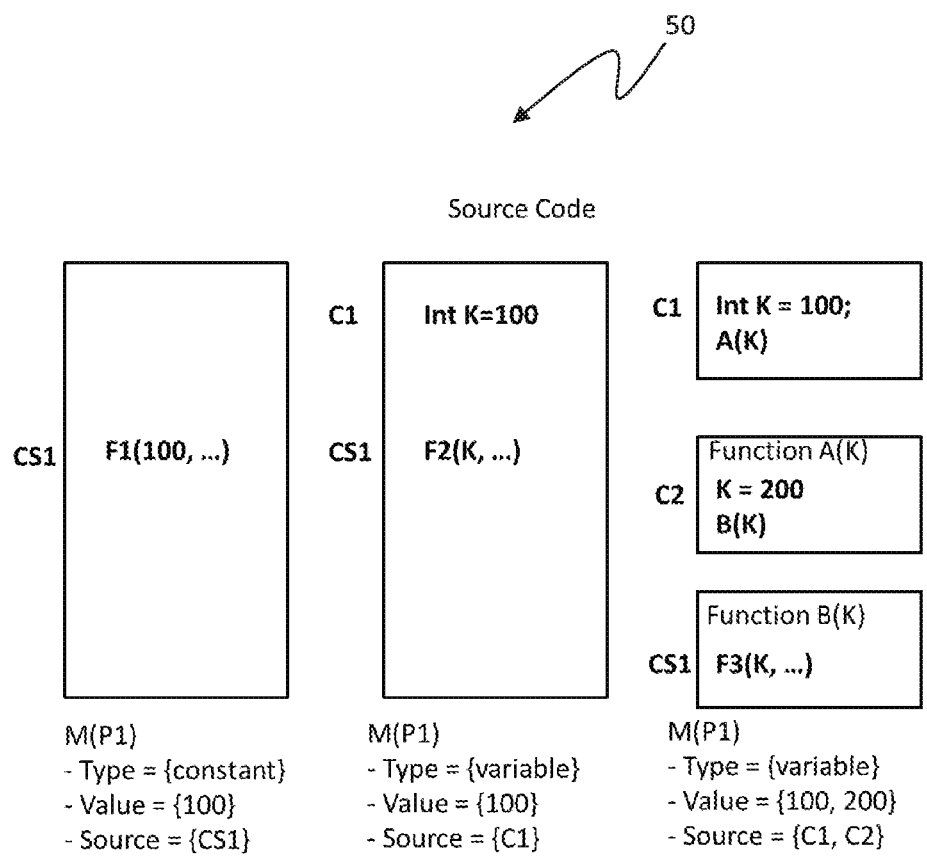
FIG. 4 is a block/flow diagram of metadata examples for a parameter in the privilege data flow graph, in accordance with embodiments of the present invention.

FIG. 4 is a block/flow diagram of metadata examples 50 for a parameter in the privilege data flow graph, in accordance with embodiments of the present invention.

For simplicity, three examples are shown which all use a first parameter P1, but the actual representation includes the metadata for all parameters.

In the first case, the first parameter is 100, which is a constant value. Therefore, the type field of metadata has the constant value. The possible value is only 100 because it is a constant. Thus, the value field of the metadata has 100. The list of source code locations to modify this parameter is only the privilege change operation F1 itself. Therefore, its code location CS1 is included in the source field of metadata.

In the second case, the privilege change operation F2 uses a variable K as its first parameter. This value is defined in the code location C1 as 100. Therefore, the type field of the metadata is variable and its possible value is 100. The source field includes C1 which defines the value.

In the third case, the first parameter is defined in the code location C1 with the value 100. Then it is passed to the privilege change function F3 via two function calls A and B. Its type field is a variable and it can have two possible values 100 and 200, which respectively are defined at code locations C1 and C2. The source field of metadata includes these two locations correspondingly.

In the source code analysis, the whole function call relationships are understood in the inter-procedural analysis and the data dependency analysis tracks the definition and manipulation of parameter values. Such information is stored as metadata for each parameter for the privilege change operations.

Figure 5:
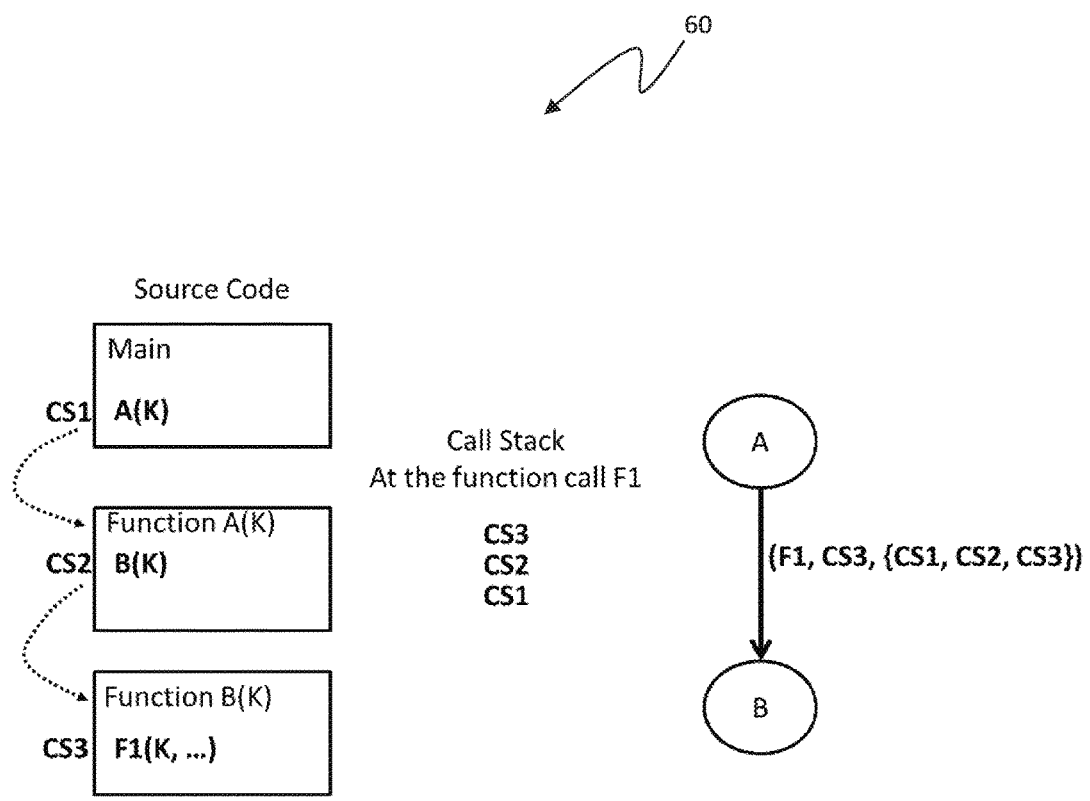
FIG. 5 is a block/flow diagram of an example privilege call context graph, in accordance with embodiments of the present invention.

FIG. 5 is a block/flow diagram 60 of an example privilege call context graph 18, in accordance with embodiments of the present invention.

The privilege call context graph (PCCG) 18 is a graph where a node is a privilege state of a program and an edge is a transition between a source and destination privilege states. An edge has the properties regarding the privilege change function F1, a call site of F1, CS1, and the call context of F1, which is a call stack status when F1 is invoked.

FIG. 5 illustrates an example of nodes and an edge of a PCCG. In the left side, there are function calls from the main function to the function A, and from A to the function B, which further invokes a privilege change function F1. When F1 is invoked, a call stack status is shown in the middle of FIG. 5, which includes three call sites CS1, CS2, CS3, which lead to the function call to F1. The corresponding PCCG on the left shows that there is a transition between the privilege state A and B, and the transition occurred due to a function call to F1 at CS3. Also, the call stack at this call {CS1, CS2, and CS3} is annotated in the graph.

Figure 6:
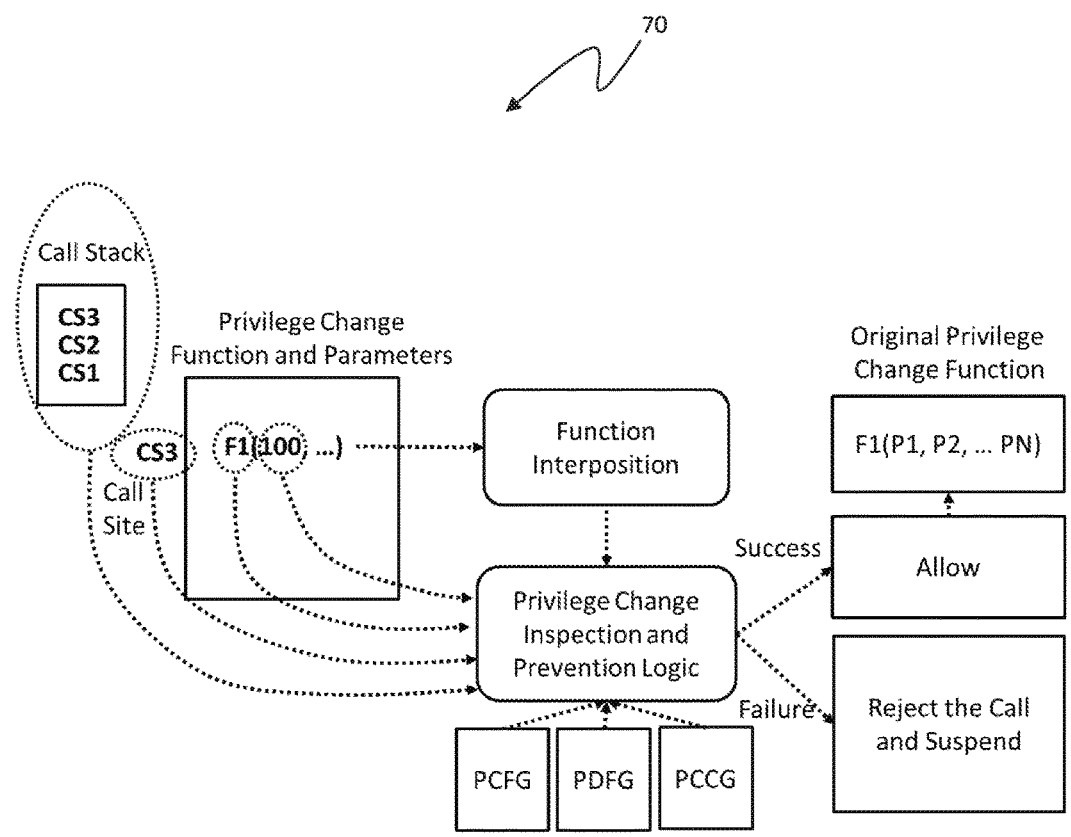
FIG. 6 is a block/flow diagram of a runtime inspection and anomaly prevention system, in accordance with embodiments of the present invention.

FIG. 6 is a block/flow diagram 70 of a runtime inspection and anomaly prevention system, in accordance with embodiments of the present invention.

Based on the information regarding privilege changes, PCFG, PDFG, and PCCG, the program source code is instrumented to insert the inspection code to check proper transitions of privileges and the code to prevent invalid transitions if they occur. After these new functions are inserted into the program in the source code, the program is rebuilt using the revised code. The newly produced program binary is deployed and used for secured program execution.

In module 22 (FIG. 1), the instrumented program is monitored at runtime with the prevention of any abnormal privilege change. When the instrumented program executes, any privilege change operation is captured by using a function interposition technique, which can be implemented by any of source code instrumentation, library interposition, and system call monitoring mechanisms.

Once a function call for a privilege change is captured by module 22, it is handled by the Privilege Change Inspection and Prevention Logic (PIPL). This logic obtains two kinds of inputs. The first input is a runtime state in the function calls to privilege change functions, such as parameter data, the call site, and call stack from the invoked function, and the second input is the PCFG, PDFG, PCCG constructed from the static analysis of the program.

PIPL compares these two inputs and checks whether observed information regarding just invoked privilege change functions can be found in the statically analyzed information (e.g., PCFG, PDFG, and PCCG). If the matched case is found (Success), an original privilege change function is invoked. If it is not found, it is considered as an anomaly case. Therefore, the privilege change call is rejected and the program is suspended into a file for an offline analysis.

Figure 7:
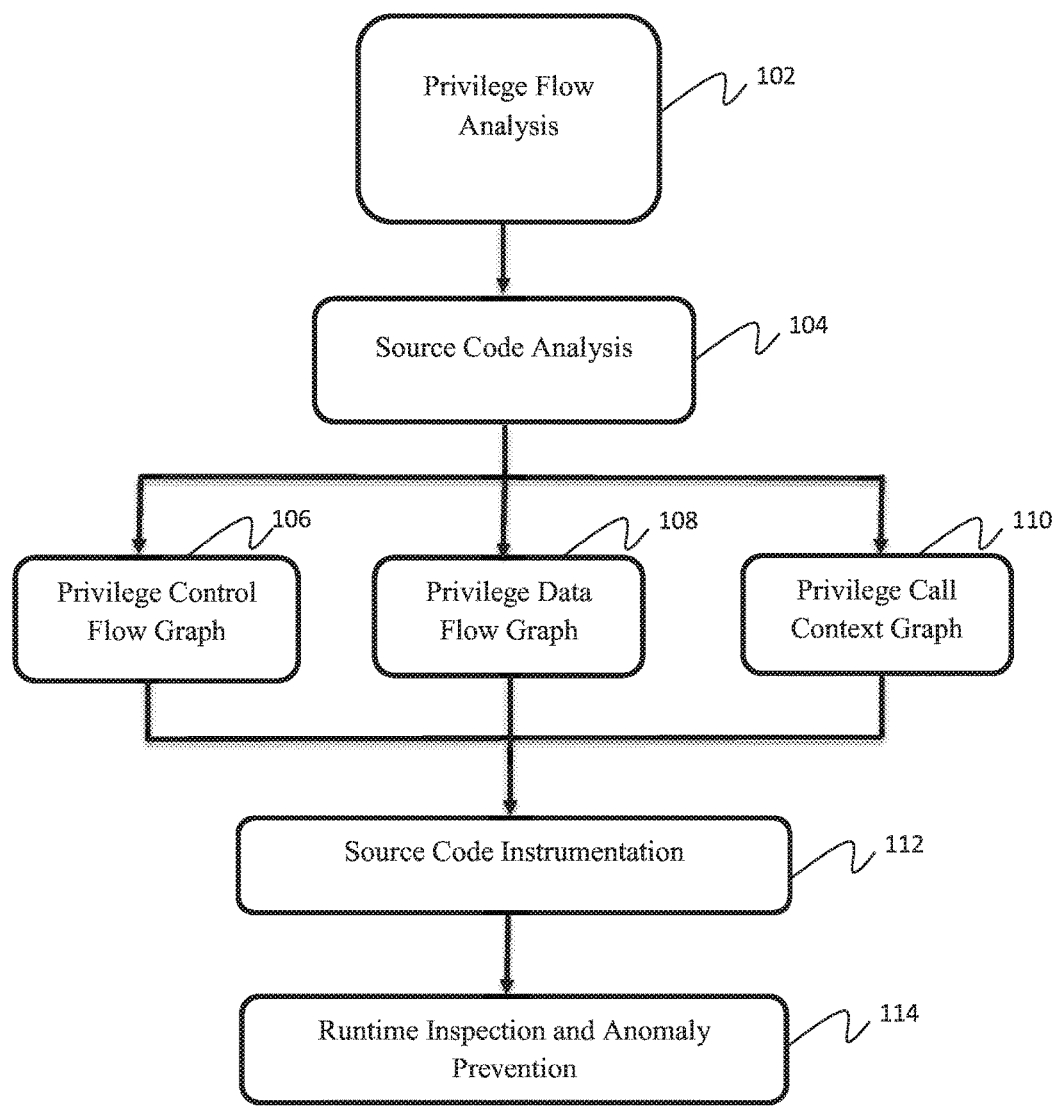
FIG. 7 is a block/flow diagram of a method for privilege flow analysis, in accordance with embodiments of the present invention.

FIG. 7 is a block/flow diagram of a method for privilege flow analysis, in accordance with embodiments of the present invention.

At block 102, a privilege flow analysis is performed.

At block 104, a source code analysis is performed.

At block 106, a privilege control flow graph (PCFG) is generated.

At block 108, a privilege data flow graph (PDFG) is generated.

At block 110, a privilege call context graph (PCCG) is generated.

At block 112, source code instrumentations is implemented.

At block 114, runtime inspection and anomaly prevention is executed.

In summary, the exemplary embodiments of the present invention involve the construction of PCFG, PDFG, PCCG, and the runtime comparison of that information and runtime function call information, which is performed by the privilege change inspection and prevention logic (PIPL). The new information and the comparisons allow for fine-grained detection of abnormal usages of privilege change operations. Additionally, the exemplary embodiments of the present invention check a context of privilege transitions, such as code location, call stack, and data. The exemplary embodiments of the present invention further analyze and handle complex privilege transitions of programs that can include an escalated privilege as part of its normal behavior by checking how privilege change operations are used as intended in the source code in terms of code location, call stack, and data. Therefore, fine-grained analysis and anomaly detection of privilege change operations for programs can be achieved to enable a high quality of a secure execution environment for programs.

Figure 8:
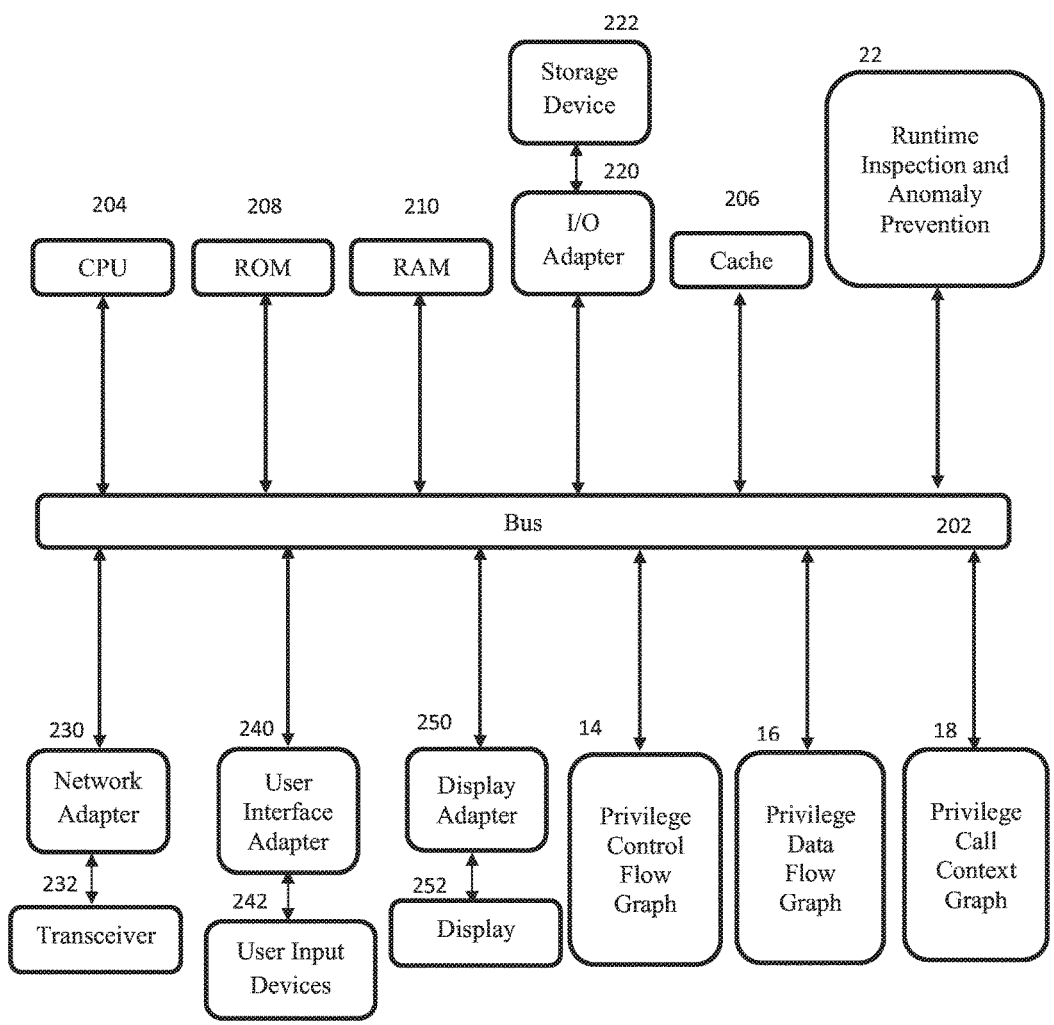
FIG. 8 is an exemplary privilege flow analysis processing system, in accordance with embodiments of the present invention.

FIG. 8 is an exemplary privilege flow analysis processing system, in accordance with embodiments of the present invention.

The processing system includes at least one processor (CPU) 204 operatively coupled to other components via a system bus 202. A cache 206, a Read Only Memory (ROM) 208, a Random Access Memory (RAM) 210, an input/output (I/O) adapter 220, a network adapter 230, a user interface adapter 240, and a display adapter 250, are operatively coupled to the system bus 202. Additionally, a privilege control flow graph 14 module, a privilege data flow graph module 16, a privilege call context graph module 18, and a runtime inspection and anomaly prevention module 22 are operatively coupled to the system bus 202.

A storage device 222 is operatively coupled to system bus 202 by the I/O adapter 220. The storage device 222 can be any of a disk storage device (e.g., a magnetic or optical disk storage device), a solid state magnetic device, and so forth.

A transceiver 232 is operatively coupled to system bus 202 by network adapter 230.

User input devices 242 are operatively coupled to system bus 202 by user interface adapter 240. The user input devices 242 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 242 can be the same type of user input device or different types of user input devices. The user input devices 242 are used to input and output information to and from the privilege flow analysis processing system.

A display device 252 is operatively coupled to system bus 202 by display adapter 250.

Of course, the privilege flow analysis processing system may also include other elements (not shown), as readily contemplated by one of skill in the art, as well as omit certain elements. For example, various other input devices and/or output devices can be included in privilege flow analysis processing system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the privilege flow analysis processing system are readily contemplated by one of ordinary skill in the art given the teachings of the present invention provided herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for analyzing operations of privilege changes, the method comprising:
   inputting source code of a program from a computing device;
   performing, via the processor, source code analysis on the program by:
      generating a privilege control flow graph (PCFG);
      generating a privilege data flow graph (PDFG) defined as a graph where a node is a privilege state of the program and an edge is a transition between source and destination privilege states, the edge having properties regarding parameters for privilege change operations, metadata of the parameters including three properties, the first property indicating whether a parameter of the parameters is a constant or a variable, the second property shows possible values either as a list of values or a range of values with start and end values, and the third property represents a list of source code locations which define and manipulate the values; and
      generating a privilege call context graph (PCCG);
   based on the source code analysis results, instrumenting the source code of the program to insert an inspection code to check for proper transitions of privileges and to prevent potential invalid privilege transitions;
   rebuilding the program by employing revised code including information from the PCFG, the PDFG, and the PCCG;
   at runtime inspection, deploying the rebuilt program to the computing device to perform runtime inspection to determine potential abnormal usages of the privilege change operations.

2. The method of claim 1, wherein the privilege control flow graph provides code locations of the privilege change operations, includes all transitions of privileges inside the program in the nodes, and includes all possible transitions regarding what privilege change functions are employed.

3. The method of claim 2, wherein the privilege data flow graph provides data flow of the parameters of the privilege change operations.

4. The method of claim 3, wherein the privilege call context graph provides possible call stacks when the privilege change operations are invoked.

5. The method of claim 4, wherein the runtime inspection determines whether the privilege change operations are invoked from places obtained from static analysis.

6. The method of claim 5, wherein the runtime inspection determines whether the parameters of the privilege change operations are consistent with data obtained in the static analysis.

7. The method of claim 6, wherein the runtime inspection determines whether the call stacks at the privilege change operations are consistent with possible call stacks obtained from the static analysis.

8. The method of claim 1, wherein the runtime inspection includes privilege change inspection and prevention logic (PIPL) for comparing the PCFG, PDFG, and PCCG graphs with runtime function call information.

9. A system for analyzing operations of privilege changes, the system comprising:
   a memory; and
   a processor in communication with the memory, wherein the processor is configured to:
      input source code of a program from a computing device;
      perform, via the processor, source code analysis on the program by:
         generating a privilege control flow graph (PCFG);
         generating a privilege data flow graph (PDFG) defined as a graph where a node is a privilege state of the program and an edge is a transition between source and destination privilege states, the edge having properties regarding parameters for privilege change operations, metadata of the parameters including three properties, the first property indicating whether a parameter of the parameters is a constant or a variable, the second property shows possible values either as a list of values or a range of values with start and end values, and the third property represents a list of source code locations which define and manipulate the values; and
         generating a privilege call context graph (PCCG);
      based on the source code analysis results, instrument the source code of the program to insert an inspection code to check for proper transitions of privileges and to prevent potential invalid privilege transitions;
      rebuild the program by employing revised code including information from the PCFG, the PDFG, and the PCCG;
      at runtime inspection, deploy the rebuilt program to the computing device to perform runtime inspection to determine potential abnormal usages of the privilege change operations.

10. The system of claim 9, wherein the privilege control flow graph provides code locations of the privilege change operations, includes all transitions of privileges inside the program in the nodes, and includes all possible transitions regarding what privilege change functions are employed.

11. The system of claim 10, wherein the privilege data flow graph provides data flow of the parameters of the privilege change operations.

12. The system of claim 11, wherein the privilege call context graph provides possible call stacks when the privilege change operations are invoked.

13. The system of claim 12, wherein the runtime inspection determines whether the privilege change operations are invoked from places obtained from static analysis.

14. The system of claim 13, wherein the runtime inspection determines whether the parameters of the privilege change operations are consistent with data obtained in the static analysis.

15. The system of claim 14, wherein the runtime inspection determines whether the call stacks at the privilege change operations are consistent with possible call stacks obtained from the static analysis.

16. The system of claim 9, wherein the runtime inspection includes privilege change inspection and prevention logic (PIPL) for comparing the PCFG, PDFG, and PCCG graphs with runtime function call information.

17. A non-transitory computer-readable storage medium comprising a computer-readable program for analyzing operations of privilege changes, wherein the computer-readable program when executed on a computer causes the computer to perform the steps of:

inputting source code of a program from a computing device;

performing, via the processor, source code analysis on the program by:

generating a privilege control flow graph (PCFG);

generating a privilege data flow graph (PDFG) defined as a graph where a node is a privilege state of the program and an edge is a transition between source and destination privilege states, the edge having properties regarding parameters for privilege change operations, metadata of the parameters including three properties, the first property indicating whether a parameter of the parameters is a constant or a variable, the second property shows possible values either as a list of values or a range of values with start and end values, and the third property represents a list of source code locations which define and manipulate the values; and generating a privilege call context graph (PCCG);

based on the source code analysis results, instrumenting the source code of the program to insert an inspection code to check for proper transitions of privileges and to prevent potential invalid privilege transitions;

rebuilding the program by employing revised code including information from the PCFG, the PDFG, and the PCCG;

at runtime inspection, deploying the rebuilt program to the computing device to perform runtime inspection to determine potential abnormal usages of the privilege change operations.

18. The non-transitory computer-readable storage medium of claim 17, wherein the privilege control flow graph provides code locations of the privilege change operations, includes all transitions of privileges inside the program in the nodes, and includes all possible transitions regarding what privilege change functions are employed;

wherein the privilege data flow graph provides data flow of the parameters of the privilege change operations; and wherein the privilege call context graph provides possible call stacks when the privilege change operations are invoked.

19. The non-transitory computer-readable storage medium of claim 18, wherein the runtime inspection determines whether the privilege change operations are invoked from places obtained from static analysis;

wherein the runtime inspection determines whether the parameters of the privilege change operations are consistent with data obtained in the static analysis; and wherein the runtime inspection determines whether the call stacks at the privilege change operations are consistent with possible call stacks obtained from the static analysis.

20. The non-transitory computer-readable storage medium of claim 17, wherein the runtime inspection includes privilege change inspection and prevention logic (PIPL) for comparing the PCFG, PDFG, and PCCG graphs with runtime function call information.

* * * * *